United States Patent
Mowlaee et al.

(10) Patent No.: US 11,438,712 B2
(45) Date of Patent: Sep. 6, 2022

(54) METHOD OF OPERATING A HEARING AID SYSTEM AND A HEARING AID SYSTEM

(71) Applicant: WIDEX A/S, Lynge (DK)

(72) Inventors: Pejman Mowlaee, Lyngby (DK); Lars Dalskov Mosgaard, Copenhagen (DK); Thomas Bo Elmedyb, Herlev (DK); Michael Johannes Pihl, Copenhagen (DK); Georg Stiefenhofer, Hundested (DK); David Pelegrin-Garcia, Lyngby (DK); Adam Westermann, Copenhagen (DK)

(73) Assignee: Widex A/S, Lynge (DK)

( * ) Notice: Subject to any disclaimer, the term of this patent is extended or adjusted under 35 U.S.C. 154(b) by 0 days.

(21) Appl. No.: 17/268,144

(22) PCT Filed: Nov. 16, 2018

(86) PCT No.: PCT/EP2018/081502
§ 371 (c)(1),
(2) Date: Feb. 12, 2021

(87) PCT Pub. No.: WO2020/035158
PCT Pub. Date: Feb. 20, 2020

(65) Prior Publication Data
US 2021/0306767 A1  Sep. 30, 2021

(30) Foreign Application Priority Data

Aug. 15, 2018 (DK) .............. PA201800462
Aug. 15, 2018 (DK) .............. PA201800465

(51) Int. Cl.
*H04R 25/00* (2006.01)
*G10L 25/78* (2013.01)

(52) U.S. Cl.
CPC ............ *H04R 25/505* (2013.01); *G10L 25/78* (2013.01); *H04R 25/405* (2013.01); *H04R 25/407* (2013.01); *H04R 25/70* (2013.01); *H04R 2225/41* (2013.01); *H04R 2225/43* (2013.01)

(58) Field of Classification Search
CPC ....... G10L 25/78; H04R 25/70; H04R 25/406; H04R 25/407; H04R 25/505; H04R 2225/41; H04R 2225/43; H04R 2225/55
See application file for complete search history.

(56) References Cited

U.S. PATENT DOCUMENTS

| | | | |
|---|---|---|---|
| 2009/0202091 A1* | 8/2009 | Pedersen ............. | H04R 25/407 381/313 |
| 2015/0289064 A1* | 10/2015 | Jensen .................. | H04R 25/30 381/317 |

FOREIGN PATENT DOCUMENTS

| | | |
|---|---|---|
| WO | 2009/034524 A1 | 3/2009 |
| WO | 2012/076045 A1 | 6/2012 |

OTHER PUBLICATIONS

Rade Kutil, "Biased and unbiased estimation of the circular mean resultant length and its variance", A Journal of Theoretical and Applied Statistics, vol. 46, No. 4, Aug. 2012, pp. 549-561 (13 pages.
(Continued)

*Primary Examiner* — Brian Ensey
(74) *Attorney, Agent, or Firm* — Sughrue Mion, PLLC

(57) ABSTRACT

A method of operating a hearing aid system in order to provide improved noise reduction and a hearing aid system (100) adapted to carry out the method.

19 Claims, 1 Drawing Sheet

(56) References Cited

OTHER PUBLICATIONS

Richard C. Cabot, "An Introduction to Circular Statistics and its Application to Sound Localization Experiments", AES, Nov. 1977, pp. 1-18 (18 pages).
International Search Report for PCT/EP2018/081502 dated Apr. 12, 2019 (PCT/ISA/210).
Written Opinion for PCT/EP2018/081502 dated Apr. 12, 2019 (PCT/ISA/237).

* cited by examiner

METHOD OF OPERATING A HEARING AID SYSTEM AND A HEARING AID SYSTEM

The present invention relates to a method of operating a hearing aid system. The present invention also relates to a hearing aid system adapted to carry out said method.

BACKGROUND OF THE INVENTION

Generally, a hearing aid system according to the invention is understood as meaning any device which provides an output signal that can be perceived as an acoustic signal by a user or contributes to providing such an output signal, and which has means which are customized to compensate for an individual hearing loss of the user or contribute to compensating for the hearing loss of the user. They are, in particular, hearing aids which can be worn on the body or by the ear, in particular on or in the ear, and which can be fully or partially implanted. However, some devices whose main aim is not to compensate for a hearing loss, may also be regarded as hearing aid systems, for example consumer electronic devices (televisions, hi-fi systems, mobile phones, MP3 players etc.) provided they have, however, measures for compensating for an individual hearing loss.

Within the present context a traditional hearing aid can be understood as a small, battery-powered, microelectronic device designed to be worn behind or in the human ear by a hearing-impaired user. Prior to use, the hearing aid is adjusted by a hearing aid fitter according to a prescription. The prescription is based on a hearing test, resulting in a so-called audiogram, of the performance of the hearing-impaired user's unaided hearing. The prescription is developed to reach a setting where the hearing aid will alleviate a hearing loss by amplifying sound at frequencies in those parts of the audible frequency range where the user suffers a hearing deficit. A hearing aid comprises one or more microphones, a battery, a microelectronic circuit comprising a signal processor, and an acoustic output transducer. The signal processor is preferably a digital signal processor. The hearing aid is enclosed in a casing suitable for fitting behind or in a human ear.

Within the present context a hearing aid system may comprise a single hearing aid (a so called monaural hearing aid system) or comprise two hearing aids, one for each ear of the hearing aid user (a so called binaural hearing aid system). Furthermore, the hearing aid system may comprise an external device, such as a smart phone having software applications adapted to interact with other devices of the hearing aid system or such as an independent external microphone with wireless link means. Thus, within the present context the term "hearing aid system device" may denote a hearing aid or an external device.

The mechanical design has developed into a number of general categories. As the name suggests, Behind-The-Ear (BTE) hearing aids are worn behind the ear. To be more precise, an electronics unit comprising a housing containing the major electronics parts thereof is worn behind the ear. An earpiece for emitting sound to the hearing aid user is worn in the ear, e.g. in the concha or the ear canal. In a traditional BTE hearing aid, a sound tube is used to convey sound from the output transducer, which in hearing aid terminology is normally referred to as the receiver, located in the housing of the electronics unit and to the ear canal. In some modern types of hearing aids, a conducting member comprising electrical conductors conveys an electric signal from the housing and to a receiver placed in the earpiece in the ear. Such hearing aids are commonly referred to as Receiver-In-The-Ear (RITE) hearing aids. In a specific type of RITE hearing aids the receiver is placed inside the ear canal. This category is sometimes referred to as Receiver-In-Canal (RIC) hearing aids.

In-The-Ear (ITE) hearing aids are designed for arrangement in the ear, normally in the funnel-shaped outer part of the ear canal. In a specific type of ITE hearing aids the hearing aid is placed substantially inside the ear canal. This category is sometimes referred to as Completely-In-Canal (CIC) hearing aids. This type of hearing aid requires an especially compact design in order to allow it to be arranged in the ear canal, while accommodating the components necessary for operation of the hearing aid.

Hearing loss of a hearing impaired person is quite often frequency-dependent. This means that the hearing loss of the person varies depending on the frequency. Therefore, when compensating for hearing losses, it can be advantageous to utilize frequency-dependent amplification. Hearing aids therefore often provide to split an input sound signal received by an input transducer of the hearing aid, into various frequency intervals, also called frequency bands, which are independently processed. In this way, it is possible to adjust the input sound signal of each frequency band individually to account for the hearing loss in respective frequency bands.

Despite the advantages that contemporary hearing aid systems provide, some hearing aid system users may still experience hearing situations that are difficult. A critical element when seeking to alleviate such difficulties is the hearing aid systems ability to suppress noise.

It is therefore a feature of the present invention to provide a method of operating a hearing aid system that provides improved noise reduction.

It is another feature of the present invention to provide a hearing aid system adapted to provide such a method of operating a hearing aid system.

SUMMARY OF THE INVENTION

The invention, in a first aspect, provides a method of operating a hearing aid system comprising the steps of:
  providing a first input signal that is at least derived from the output from a first microphone;
  providing a second input signal that is at least derived from the output from a second microphone;
  providing a third input signal that is at least derived from the output from at least one of the first, the second and a third microphone;
  determining a mean resultant length R based on samples of inter-microphone phase differences between the first and the second input signals;
  determining, based on the mean resultant length R, a frequency dependent gain adapted to provide noise suppression; and
  applying said frequency dependent gain to the third input signal in order to provide a noise suppressed signal.

This provides an improved method of operating a hearing aid system with respect to noise reduction.

The invention, in a second aspect, provides a hearing aid system comprising a first and a second microphone, a sound estimator, a digital signal processor and an electrical-acoustical output transducer;
wherein the sound estimator is adapted to:
  determine a mean resultant length R from samples of inter-microphone phase differences between a first and a second input signal; and determine a frequency dependent gain adapted to provide noise suppression based on the determined mean resultant length R;

wherein the digital signal processor is configured to:

apply the frequency dependent gain to a third input signal in order to provide a noise suppressed signal to be provided by the electrical-acoustical output transducer; and wherein the first input signal is at least derived from the output from the first microphone, the second input signal is at least derived from the output from the second microphone, and the third input signal is at least derived from at least one of the outputs from the first microphone, the second microphone and a third microphone.

This provides a hearing aid system with improved means for operating a hearing aid system with respect to noise reduction.

The invention, in a third aspect, provides a non-transitory computer readable medium carrying instructions which, when executed by a computer, cause the following method to be performed:

providing a first input signal that is at least derived from the output from a first microphone;

providing a second input signal that is at least derived from the output from a second microphone;

providing a third input signal that is at least derived from the output from at least one of the first, the second and a third microphone;

determining a mean resultant length R based on samples of inter-microphone phase differences between the first and the second input signals;

determining, based on the mean resultant length R, a frequency dependent gain adapted to provide noise suppression; and applying said frequency dependent gain to the third input signal in order to provide a noise suppressed signal.

The invention in a fourth aspect provides an internet server comprising a downloadable application that may be executed by a personal communication device, wherein the downloadable application is adapted to cause the following method to be performed:

providing a first input signal that is at least derived from the output from a first microphone;

providing a second input signal that is at least derived from the output from a second microphone;

determining a mean resultant length R based on samples of inter-microphone phase differences between the first and the second input signals;

determining, based on the mean resultant length R, a frequency dependent gain adapted to provide noise suppression; and transmitting said frequency dependent gain to a hearing aid in order to allow the hearing aid to provide a noise suppressed acoustic signal.

Further advantageous features appear from the dependent claims.

Still other features of the present invention will become apparent to those skilled in the art from the following description wherein the invention will be explained in greater detail.

BRIEF DESCRIPTION OF THE DRAWINGS

By way of example, there is shown and described a preferred embodiment of this invention. As will be realized, the invention is capable of other embodiments, and its several details are capable of modification in various, obvious aspects all without departing from the invention. Accordingly, the drawings and descriptions will be regarded as illustrative in nature and not as restrictive. In the drawings.

DETAILED DESCRIPTION

Figure 1:
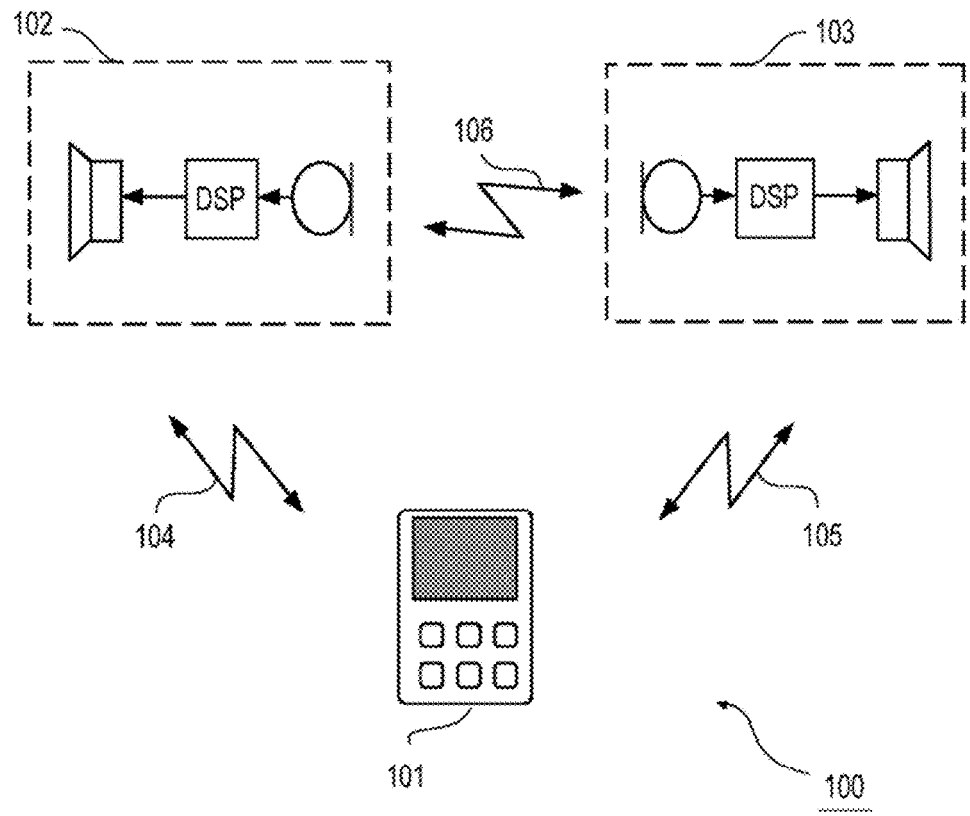
FIG. 1 illustrates highly schematically a binaural hearing aid system according to an embodiment of the invention.

In the present context the terms noise reduction, noise suppression, single channel noise reduction and single channel noise suppression may be used interchangeably. It is noted that these methods, which are the subject of the present disclosure distinguishes e.g. beamforming, which may also be named spatial processing, in that the noise suppression is provided by applying a frequency dependent gain (adapted to provide noise suppression) to a single signal (i.e. channel) as opposed to beamforming methods that provide another type of noise suppression that is achieved in the combination of at least two signals. However, said single signal may very well be the result of a spatial processing. Thus, the noise suppression methods considered in the following are single-channel methods even if not explicitly named as such.

According to the present invention the inventors have found that sound signal noise reduction may be improved by considering unbiased sound environment characteristics that are based on the inter-microphone phase difference (IPD) for a set of microphones as will be explained in further details below.

Initially, for the estimation of the IPD the properties of periodic variables need to be considered. In the following, periodic variables will due to mathematically convenience be described as complex numbers. An estimate of the IPD for a given target sound source may therefore be given as a complex number that in polar representation has an amplitude A and a phase θ. The average of a multitude of IPD estimates (which in the following may also be named IPD samples) may be given by:

$$\langle Ae^{-i\theta} \rangle = \frac{1}{n}\sum_{i=1}^{n} A_i e^{-i\theta} = R_A e^{-i\hat{\theta}_A} \quad \text{(eq. 1)}$$

Wherein $\langle \ \rangle$ is the average operator, n represents the number of IPD samples used for the averaging, RA is an averaged amplitude that depends on the phase and that may assume values in the interval $[0, \langle A \rangle]$, and $\hat{\theta}_A$ is the weighted mean phase. It can be seen that the amplitude $A_i$ of each individual sample weight each corresponding phase $\theta_i$ in the averaging. Therefore, both the averaged amplitude RA and the weighted mean phase $\hat{\theta}_A$ are biased (i.e. dependent on the other).

It is noted that the present invention is independent of the specific choice of statistical operator used to determine an average, and consequently within the present context the terms expectation operator, average or sample mean may be used to represent the result of statistical functions or operators selected from a group comprising the Boxcar function. In the following these terms may therefore be used interchangeably.

The amplitude weighting providing the weighted mean phase $\hat{\theta}_A$ will generally result in the weighted mean phase $\hat{\theta}_A$ being different from the unbiased mean phase $\hat{\theta}$ that is defined by:

$$\langle e^{-i\theta} \rangle = \frac{1}{n}\sum_{i=1}^{n} e^{-i\theta_i} = \mathrm{Re}^{-i\hat{\theta}} \qquad (\text{eq. 2})$$

As in equation (1) $\langle\ \rangle$ is the average operator and n represents the number of IPD samples used for the averaging. It follows that the unbiased mean phase $\hat{\theta}$ can be estimated by averaging a multitude of IPD samples. R is named the mean resultant length and the mean resultant length R provides information on how closely the individual phase estimates $\theta_i$ are grouped together and the circular variance V and the mean resultant length R are related by:

$$V = 1 - R \qquad (\text{eq. 3})$$

Generally, it is worth appreciating that the determination of the unbiased mean phase and the mean resultant length according to the present invention can be determined purely based on input signals and as such is highly flexible with respect to its use in hearing aid systems with different amounts and positions of microphones, considering e.g. hearing aid systems that are monaural or binaural and may comprise additional microphones in external devices.

As will be explained in detail the mean resultant length may be used to improve noise reduction in a variety of different manners and for a variety of different systems and therefore it is worth emphasizing that the mean resultant length need not be determined using only two microphone signals to provide the IPD samples but that additional microphone signals may be included whereby enhanced noise reduction performance can be achieved in certain situations.

For the estimation strategy of the unbiased mean phase and the mean resultant length to be robust in realistic dynamic sound environments it is generally preferred that the input signals (i.e. the sound environment) can be considered quasi stationary. The two main sources of dynamics are the temporal and spatial dynamics of the sound environment. For speech the duration of a short consonant may be as short as only 5 milliseconds, while long vowels may have a duration of up to 200 milliseconds depending on the specific sound. The spatial dynamics is a consequence of relative movement between the hearing aid user and surrounding sound sources. As a rule of thumb speech is considered quasi stationary for a duration in the range between say 20 and 40 milliseconds and this includes the impact from spatial dynamics.

For estimation accuracy, it is generally preferable that the duration of the involved time windows are as long as possible, but it is, on the other hand, detrimental if the duration is so long that it covers natural speech variations or spatial variations and therefore cannot be considered quasi-stationary. Furthermore, it noted that the quasi-stationarity is generally frequency dependent.

According to an embodiment of the present invention a first time window is defined by the transformation of the digital input signals into the time-frequency domain and the longer the duration of the first time window the higher the frequency resolution in the time-frequency domain, which obviously is advantageous. Additionally, the present invention requires that the final estimate of an inter-microphone phase difference is based on a calculation of an expectation value and it has been found that the number of individual samples used for calculation of the expectation value preferably exceeds at least 5.

According to a more specific embodiment the combined effect of the first time window and the calculation of the expectation value provides an effective time window that is shorter than 40 milliseconds or in the range between 5 and 200 milliseconds such that the sound environment in most cases can be considered quasi-stationary.

According to a variation improved accuracy of the unbiased mean phase or the mean resultant length may be provided by obtaining a multitude of successive samples of the unbiased mean phase and the mean resultant length, in the form of a complex number using the methods according to the present invention and subsequently adding these successive estimates (i.e. the complex numbers) and normalizing the result of the addition with the number of added estimates. This embodiment is particularly advantageous in that the mean resultant length effectively weights the samples that have a high probability of comprising a target source, while estimates with a high probability of mainly comprising noise will have a negligible impact on the final value of the unbiased mean phase of the inter-microphone phase difference because the samples are characterized by having a low value of the mean resultant length. Using this method, it therefore becomes possible to achieve pseudo time windows with a duration up to say several seconds or even longer and the improvements that follows therefrom, despite the fact that neither the temporal nor the spatial variations can be considered quasi-stationary.

In a variation at least one or at least not all of the successive complex numbers representing the unbiased mean phase and the mean resultant length are used for improving the estimation of the inter-microphone phase difference, wherein the selection of the complex numbers to be used are based on an evaluation of the corresponding mean resultant length (i.e. the variance) such that only complex numbers representing a high mean resultant length are considered.

According to another variation the estimation of the unbiased mean phase of the inter-microphone phase difference is additionally based on an evaluation of the value of the individual samples of the unbiased mean phase such that only samples representing the same target source are combined.

According to another variation the angular direction of a target source, which may also be named the direction of arrival (DOA) is derived from the unbiased mean phase and this may be used to select directions from which the user wants to listen whereby a corresponding noise reduction may become directional dependent. However, the DOA may also be determined using methods well known in the art that are not based on the unbiased mean phase.

According to yet another variation speech detection may be used as input to determine a preferred unbiased mean phase (which is readily transformed to a direction of arrival (DOA)) e.g. by giving preference to target sources positioned at least approximately in front of the hearing aid system user, when speech is detected. In this way it may be avoided, that direct sound from a source, that does not provide speech or is positioned more to the side than another speaker, is enhanced, whereby speakers are preferred above other sound sources and a speaker in front of the hearing aid system user is preferred above speakers positioned more to the side.

According to a more specific variation the knowledge of the direction of arrival is used to suppress sound signals from targets positioned in unwanted directions, such as the back half-plane of the hearing aid system user, even if sound signals from the targets contain speech, whereby the hearing aid system user is allowed to focus on speakers in the front half-plane.

Generally, speech detection, may be carried out using a variety of traditional speech detection methods, such as methods based on e.g. temporal variations, level variations, spectral distribution or based on feature based trained models or, more specifically, methods such as disclosed in WO-A1-2012076045. However, speech detection methods or the corresponding methods for estimating speech presence probability (SPP) or speech absence probability (SAP) may also be based on the mean resultant length R by using that a high value of the mean resultant length is very likely to represent a sound environment with a single primary sound source. However, since a single primary sound source may be a single speaker or something else such as a person or a loudspeaker playing music it will be advantageous to combine the mean resultant length based methods with one or more of the traditional speech detection methods. In a specific variation values of the SPP (or the SAP), that are estimated based on different signal properties, are combined as a joint probability.

In fact a variety of sound environment characteristics including signal-to-noise ratio (SNR), noise power spectral density (noise PSD) and coherent-to-diffuse-ratio (CDR) may also be estimated based on the mean resultant length R and also in these contexts it will be advantageous to combine the R based estimations with other estimation methods based e.g. on spectral or temporal characteristics. In variations the estimation values obtained using a multitude of estimation methods may be combined by taking some average of the values, or by taking the minimum or the maximum of the values (depending typically of the sound environment or the hearing aid system user's preferences).

According to another variation the mean resultant length can be used to determine how to weight information, such as a determined DOA of a target source, from each hearing aid of a binaural hearing aid system. More generally the mean resultant length can be used to compare or weight information obtained from a multitude of microphone pairs, such as the multitude of microphone pairs that are available in e.g. a binaural hearing aid system comprising two hearing aids each having two microphones. However, this needs to be carried out such that the interaural level difference (ILD) and the interaural time difference (ITD) are conserved or at least accounted for. In a variation this may be done by keeping the applied hearing aid gain on both sides of the head not too different such that the binaural cues are maintained to at least some degree.

Reference is now given to FIG. 1, which illustrates highly schematically a binaural hearing aid system 100 comprising a first 102 and a second 103 (i.e. left and right) hearing aid and an external device 103. The external device 103 comprises an external microphone (not shown) and at least one wireless link 104, 105 and 106 between the hearing aids and the external device enables sound processing in the hearing aids to be carried out based on at least some of the microphones in the hearing aids and the external device.

In a variation, the binaural hearing aid system 100 comprises a multitude of external devices and additional microphones accommodated therein.

In another variation the binaural hearing aid system 100 is wirelessly connected to a multitude of external devices and hereby have access to the microphone signals obtained by these external devices, even though these external devices are not part of the hearing aid system 100 as such. Examples of such external devices may be smart phones of persons the hearing aid system user is speaking with.

Figure 2:
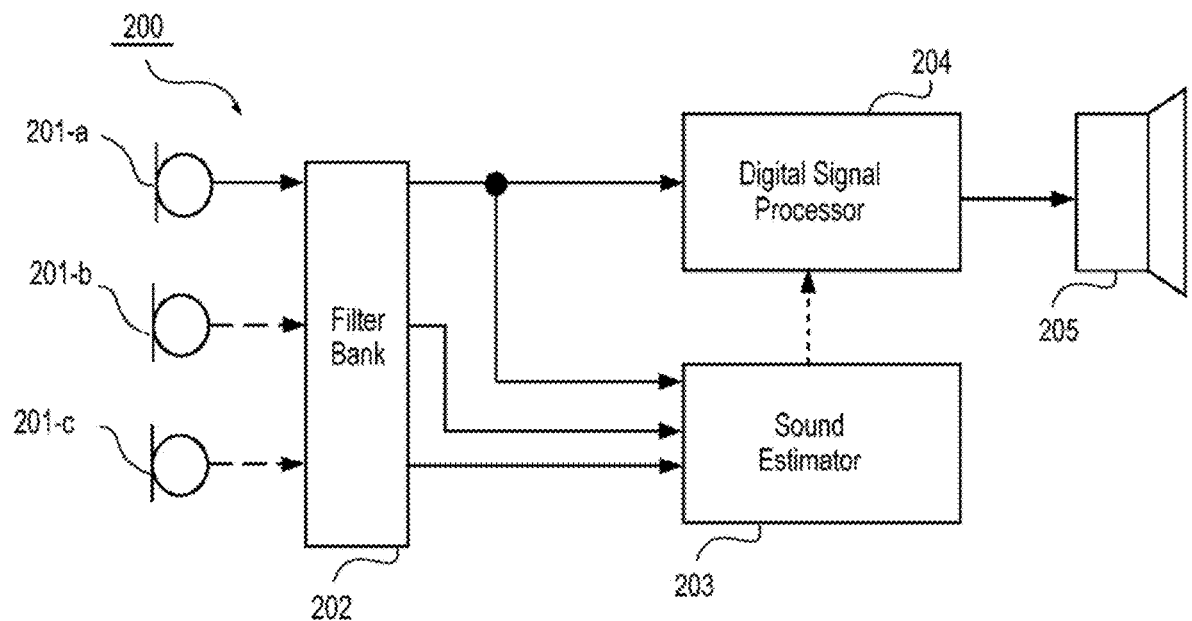
FIG. 2 illustrates highly schematically a hearing aid system according to an embodiment of the invention.

Reference is now made to FIG. 2, which illustrates highly schematically a hearing aid 200 of a hearing aid system according to an embodiment of the invention.

The hearing aid system comprises a first hearing aid 200 (that in the following will be named the ipse-lateral or left hearing aid), a second hearing aid (that in the following will be named the contra-lateral or right hearing aid) and an external device (for clarity reasons the second hearing aid and the external device are not shown). However, a first acoustical-electrical input transducer accommodated in the ipse-lateral hearing aid 201-$a$ is shown together with a second acoustical-electrical input transducer 201-$b$ accommodated in the contra-lateral hearing aid and a third acoustical-electrical input transducer 201-$c$ accommodated in the external device (in the following the acoustical-electrical input transducers may also be named microphones). The lines connecting the microphones 201-$b$ and 201-$c$ to the remaining parts of the hearing aid 200 are dashed in order to illustrate that these microphones (i.e. the input signals at least derived from at least these microphones, as will be discussed below in variations of the present embodiment) are operatively connected to the hearing aid 200 through at least one wireless link. The hearing aid 200 further comprises a filter bank 202, a sound estimator 203, a digital signal processor 204 and an electrical-acoustical output transducer 205.

According to the present embodiment the microphones 201-$a$, 201-$b$ and 201-$c$ provide analog output signals that are converted into digital output signals by analog-digital converters (that for clarity reasons are not shown) and subsequently provided to a filter bank 202 adapted to transform the digital input signals into the time-frequency domain. One specific advantage of transforming the input signals into the time-frequency domain is that both the amplitude and phase of the signals become directly available in the provided individual time-frequency bins.

According to an embodiment a Fast Fourier Transform (FFT) may be used for the transformation and in variations other time-frequency domain transformations can be used such as a Discrete Fourier Transform (DTF) or a polyphase filterbank.

In variations analog-digital converters and filter banks may be accommodated in at least one of the contra-lateral hearing aid and the external device such that e.g. input signals in the time-frequency domain are transmitted to the first hearing aid using the wireless links and that therefore corresponding analog-digital converter and filter bank are by-passed.

In the following the transformed digital input signals provided by the time-frequency domain filter bank may also be named "input signal". In a similar manner all other signals referred to in the present disclosure may or may not be specifically named as digital signals. Finally, at least the terms input signal, digital input signal, transformed digital input signal, frequency band input signal, sub-band signal and frequency band signal may be used interchangeably in the following and unless otherwise noted the input signals can generally be assumed to be frequency band signals independent on whether the filter bank 102 provide frequency band signals in the time domain or in the time-frequency domain. Furthermore, it is generally assumed, here and in the following, that the microphones are omni-directional.

In a specific and less advantageous variation the input signals are not transformed into the time-frequency domain. Instead the input signals are first transformed into a number of frequency band signals by a time-domain filter bank comprising a multitude of time-domain bandpass filters, such as Finite Impulse Response bandpass filters and subsequently the frequency band signals are compared using correlation analysis wherefrom the phase is derived.

The input signal provided by the ipse-lateral microphone 201-*a* is branched and provided both to the digital signal processor 204 and to the sound estimator 203 while the input signals provided by the contra-lateral microphone 201-*b* and the external device microphone 201-*c* are not branched and are consequently only provided to the sound estimator 203.

The digital signal processor 204 may be adapted to provide various forms of signal processing including at least: noise reduction, speech enhancement and hearing compensation. However, in the present context focus will be on the noise reduction.

According to the present embodiment the sound estimator 203 is configured to provide improved estimates of characteristics of the current sound environment of the hearing aid system and provide this information to the digital signal processor 204 such that an improved noise reduction is provided.

In variations of the present embodiment the input signals may be spatially processed (which in the following may also be named beamformed) and the resulting beamformed signal provided as input to the digital signal processor 204. According to a more specific variation two ipse-lateral input signals may be monaurally beamformed and provided to the digital signal processor 204.

According to another specific variation the input signals provided from two hearing aids of a binaural hearing aid system are monaurally beamformed before being provided to the sound estimator 203, which is preferred when the signal provided to the digital signal processor 204 is likewise monaurally beamformed.

However, in another variation monaurally beamformed signals from each of the hearing aids of the binaural hearing aid system are provided to the sound estimator 203, independent on whether the signal provided to the digital signal processor 204 is likewise beamformed, whereby a spatial focus in the analysis carried out by the sound estimator 203 is allowed.

According to a more specific variation monaural beamforming of the signals from the two hearing aids is used to provide two front pointing cardioids as input to the sound estimator 203 whereby an SNR estimate or some other sound environment characteristic can be determined based primarily on the front half plane of the sound environment.

In further variations at least one monaurally beamformed signal is provided to the sound estimator 203 wherein the at least one monaurally beamformed signal is combined with a signal from an external device microphone in order to provide a resultant length.

According to yet another variation, ipse-lateral microphone signals are monaurally beamformed and provided to the digital signal processor 204, while the input to the sound estimator 203 consists only of signals that are not the result of beamforming. This variation may especially be advantageous in the case, where only two microphones are available, because two signals are needed for the analysis required to provide a frequency dependent gain, according to the invention, and two signals are likewise required to obtain a beamformed signals that may subsequently have the frequency dependent gain applied.

Now, considering the hearing aid system of the present embodiment the normalized cross-correlations, between each of the ipse-lateral microphone 201-*a* and the contra-lateral microphone 201-*b* with the external microphone signal 201-*c*, may, when processed using the circular statistics explained with reference to equation 2, be given by:

$$E\left\{\frac{Y_L Y_E^*}{|Y_L Y_E^*|}\right\} = R_L e^{j\hat{\theta}_L} \qquad \text{(eq. 4-a)}$$

$$E\left\{\frac{Y_R Y_E^*}{|Y_R Y_E^*|}\right\} = R_R e^{j\hat{\theta}_R} \qquad \text{(eq. 4-b)}$$

wherein $Y_L$, $Y_R$, $Y_E$ represent the digitally transformed input signals from respectively the ipse-lateral, contra-lateral and external microphone and $R_L$, $R_R$, $\hat{\theta}_L$, $\hat{\theta}_R$ the corresponding ipse- and contra-lateral mean resultant lengths and unbiased mean phases.

The addition of an external microphone is advantageous because it provides an improved target sound source signal, with improved signal-to-noise ratio (SNR), due to the presumably short spacing between the target sound source and the external microphone compared to the distance between the target sound source and the hearing aid microphones.

Furthermore, when the distance between an external device and the hearing aids are sufficiently large the noise in the hearing aid microphone signals will be spatially uncorrelated with the noise in an external microphone signal and the advantageous effect hereof is that diffuse noise is rendered incoherent and therefore easier to identify and subsequently suppress. Generally, the distance between an external device and the hearing aids may be considered sufficiently large if the external device is a smart phone that is positioned on a meeting table or if the external device is an external microphone device that is worn by a person the hearing aid system user would like to listen particularly to.

Finally, the spacing between the external microphone 201-*c* and the hearing aid microphones 201-*a* and 201-*b* typically also renders other sound sources that are positioned sufficiently far away from either the hearing aids or the external microphone incoherent and therefore easier to identify and subsequently suppress. Thus the ipse- and contra-lateral mean resultant lengths $R_L$ and $R_R$, which may be determined using equations 4-a or 4-b are advantageous as is, but the corresponding unbiased mean phases are of little use since the interpretation of the value of the determined unbiased mean phases according to equations 4-a and 4b depend on the relative position of the external microphone relative to the hearing aids and this relative position is generally unknown. However, in variations the hearing aid system may comprise means to determine this relative positions e.g. using optical or infrared detection mechanisms or according to another variation using the wireless link of a binaural hearing aid system to do a triangularization detection based e.g. on the received signal strength indication (RSSI).

In general it is worth noting that different modalities experience different noise statistics, hence have different noise robustness, and therefore provide different estimates of the signal-to-noise ratio SNR. As a result, the combination of different modalities will generally provide an improved SNR estimate.

However, according to the present embodiment a binaural IPD sample may be estimated from the normalized cross-correlations between the ipse-lateral and contra-lateral microphone signals each with the external microphone signal and when combining this with equations 4-a and 4-b:

$$E\left\{\frac{Y_L Y_E^*}{|Y_L Y_E^*|}\right\} E\left\{\frac{Y_R Y_E^*}{|Y_R Y_E^*|}\right\}^* = R_L R_R e^{j(\hat{\theta}_L - \hat{\theta}_R)} = R_{BB} e^{j(\hat{\theta}_{BB})} \quad \text{(eq. 5)}$$

wherein $R_{BB}$ represents the binaural mean resultant length and $\hat{\theta}_{BB}$ represents the binaural unbiased mean phase. Thus, by using the external microphone signal as in equations 4-a and 4-b, rather than estimating the binaural inter microphone phase difference directly from the hearing aid microphone signals, the attractive properties of the external microphone are included in the estimates of the binaural mean resultant length $R_{BB}$ and the binaural unbiased mean phase $\hat{\theta}_{BB}$. Furthermore, the binaural unbiased mean phase $\hat{\theta}_{BB}$ may now be used to determine the DOA of a specific sound relative to the binaural hearing aid microphones and independent on the position of the external microphone.

The external microphone enhanced estimates of the binaural mean resultant length $R_{BB}$ and the binaural unbiased mean phase $\hat{\theta}_{BB}$ may be used for several signal processing features. However, according to the present context and the present embodiment the focus is on utilizing the external microphone enhanced binaural mean resultant length $R_{BB}$ (which in the following may also be named the external microphone enhanced mean resultant length) for noise suppression.

Now, using estimation theory to estimate a single sinusoid in additive white noise and subsequently extend the result to a sum of sinusoids then a good model to approximate speech and music is found, wherefrom a phase estimation error variance $\sigma^2$ proportionate to the inverse SNR may be determined that asymptotically is given by the equation:

$$\sigma^2(k, l) \propto \frac{1}{SNR(k, l)} \quad \text{(eq. 6)}$$

wherein $SNR(k, l)$ is the signal-to-noise ratio of one sinusoid and k and l represent respectively the frequency and time indices of a given time-frequency bin. Now, assuming the IPD is wrapped normal distributed with mean $\mu(k, l)$ and standard deviation $\sigma(k, l)$ we get:

$$R(k, l) = e^{-\frac{\sigma^2(k,l)}{2}} \quad \text{(eq. 7)}$$

wherein $R(k,l)$ represents a mean resultant length, such as the external microphone enhanced mean resultant length $R_{BB}$, some mapped mean resultant length or some other resultant length determined using any of the embodiments and the corresponding variations. The wrapped normal distribution is obtained by wrapping the normal distribution around the unit circle and adding all probability mass wrapped to the same point.

Now, by combining equations 6 and 7 we get:

$$SNR_d(k, l) = -\frac{1}{2 \ln R(k, l)} \quad \text{(eq. 8)}$$

wherein $SNR_d$ represents a so called directional or spatial signal-to-noise ratio because $SNR_d$ is based on the mean resultant length $R(k,l)$.

Now referring to the present embodiment of FIG. 2, the input signals from the three microphones 201-a, 201-b and 201-c are provided to the sound estimator 203 and used to provide a directional SNR that subsequently is used to control the setting of the DSP 204 such that noise in the signal from the ipse-lateral microphone 201-a is suppressed. The noise suppression (i.e. a frequency dependent gain to be applied) may be determined using a multitude of different single-channel noise suppression methods including Wiener filtering, statistical-based methods such as maximum likelihood (ML), minimum mean square error (MMSE), Bayesian filtering, Kalman filtering and maximum a posteriori (MAP) of spectral amplitude or of spectral phase or of both.

According to a specific variation the directional signal-to-noise-ratio $SNR_d$ is used to control a directional Wiener filter gain function $\hat{w}_d(k, l)$ given by:

$$\hat{w}_d(k, l) = \frac{SNR_d(k, l)}{1 + SNR_d(k, l)} \quad \text{(eq. 9)}$$

Thus, having determined the directional Wiener filter gain function $\hat{w}_d(k,l)$ the enhanced target sound source spectral estimate (which in the following may also be named target speech spectral estimate) $\hat{X}_d(k,l)$ may be given from:

$$\hat{X}_d(k,l) = \hat{w}_d(k,l) Y(k,l) \quad \text{(eq. 10)}$$

wherein $Y(k, l)$ represents the noisy spectral coefficients of the input signal provided to the DSP 204. However, in variations the Wiener gain may be applied in a multitude of ways, including applied directly as a frequency dependent gain onto an input signal in the time-frequency domain as in the present embodiment or it could be applied directly onto an input signal divided into frequency bands in the time domain or as a broadband filter such as a linear phase filter or a minimum phase filter that may provide high quality sound with few artefacts. According to a further variation the filter is a mixed phase filter that combines linear phase in the high frequency range with minimum phase in the low frequency range or the other way around dependent at least partly on the type of binaural cue that is to be preserved. As already explained above the input signal may also be a beamformed signal.

According to further variations the frequency dependent gain, which is dependent on R, can be derived based on a multitude of appropriate cost functions, which may contain R directly or indirectly, where the Wiener gain using R to find SNR is one special case.

According to an alternative embodiment of the present invention the Wiener filter gain function (which in the following may also be named a Wiener filter mask) $\hat{w}(k, l)$ may be given by:

$$\hat{w}(k, l) = \frac{\beta(k, l)}{1 + \beta(k, l)} \quad \text{(eq. 11)}$$

wherein $\beta(k, l)$ represents an instantaneous a-posteriori SNR that may be determined from an equation given by:

$$\beta(k,l) = \xi(k,l) \gamma(k,l) \quad \text{(eq. 12)}$$

wherein $\xi(k, l)$ represents an a-priori SNR and $\gamma(k, l)$ represents an a-posterior SNR. Thus $\beta(k, l)$ represents an instantaneous a-posteriori SNR in the sense that it provides an instantaneous estimation of the SNR. The a-priori SNR $\xi(k, l)$ may be determined using the equation:

$$\xi(k, l) = \frac{\varphi_{ss}(k, l)}{\varphi_{NN}(k, l)} \qquad \text{(eq. 13)}$$

wherein $\varphi_{SS}(k, l)$ represents the target sound power spectral density (target sound PSD) and $\varphi_{NN}(k, l)$ represents the noise power spectral density (noise PSD).

According to a variation the directional signal-to-noise-ratio $SNR_d$, as defined in equation 8, may be used as the a-priori SNR.

According to a first variation the noise PSD may be estimated using standard minimum statistics without requiring a mean resultant length R.

According to a second variation the noise PSD may be estimated using a modified version of the directional Wiener filter gain function $\hat{w}_N(k, l)$ that is given as:

$$\hat{w}_N(k,l)=1-\hat{w}_d(k,l) \qquad \text{(eq. 14)}$$

wherein Y(k, l) represents the directional Wiener filter gain function $\hat{w}_d(k, l)$ (as given in eq. 9) and wherein the modified version of the directional Wiener filter gain function $\hat{w}_N(k, l)$ may be used to provide an estimate of the noise PSD $\varphi_{NN}(k, l)$ using that:

$$\varphi_{NN}(k,l)=\hat{w}_N(k,l)Y(k,l) \qquad \text{(eq. 15)}$$

wherein Y(k,l) represents the noisy spectral coefficients of the input signal provided to the DSP 204.

According to a third variation the noise PSD $\varphi_{NN}(k, l)$ may be estimated (using equation 13) directly by setting $\xi(k, l)$ equal to the directional signal-to-noise-ratio $SNR_d$, and using that the target sound PSD $\varphi_{SS}(k, l)$ may be estimated by applying the directional Wiener filter gain function $\hat{w}_d(k, l)$ to the noisy time-frequency signal bins Y(k, l), since the directional Wiener filter gain function can be determined based on the directional signal-to-noise-ratio $SNR_d$.

The a-posterior SNR $\gamma(k, l)$ may be determined using the equation:

$$\gamma(k, l) = \frac{|Y(k, l)|^2}{\varphi_{NN}(k, l)} \qquad \text{(eq. 16)}$$

wherein Y(k, l) represents the noisy time-frequency signal bins.

As described above the directional SNR, the target sound PSD and the noise PSD may be determined based on a mean resultant length. Now having these a single-channel speech presence probability (p(k,l)) may be determined using the equation given by:

$$p(k, l) \triangleq \left\{1 + \frac{q(k, l)}{1 - q(k, l)} \xi(k, l) e^{-\frac{\beta(k,l)}{1+\xi(k,l)}}\right\}^{-1} \qquad \text{(eq. 17)}$$

wherein q(k, l) represents an a-priori speech absence probability.

In variations q(k, l) may be considered a hyper parameter and therefore estimated as such or q(k, l) may just be given a fixed value if the hyper parameter estimations demands to many processing resources, and in an even more specific variation the fixed value of q(k, l) is selected from a range between 0.3 and 0.7. In yet other variations q(k, l) is set equal to 1−p(k, l). In still other variations q(k,l) is determined based on the values of the speech presence probability in adjacent frames or adjacent frequency bins.

According to another variation an enhanced target sound source spectral estimate $\hat{X}(k, l)$ may be determined from the equation given by:

$$\hat{X}(k,l)=p(k,l)\hat{X}_d(k,l)+q(k,l)G_{min}(k)Y(k,l) \qquad \text{(eq. 18)}$$

wherein p(k,l) may be given from equation 17 or from some other speech presence probability estimator (including estimators based on temporal variations, level variations, the spectral distribution or based on feature based trained models), wherein $\hat{X}_d(k, l)$ may be given from equation 10 and and $G_{min}(k)$ is a remixing level constant adapted to control the remixing levels between the two parts of the sum that equation 16 consists of. In variations $G_{min}(k)$ may be selected to be in the range between (−) 1 and (−) 30 db, but generally these values are highly dependent on the considered target source and in other variations the remixing level constant $G_{min}(k)$ may be omitted.

According to another similar variant the enhanced target sound source spectral estimate $\hat{X}(k, l)$ may be determined from the equation given by:

$$\hat{X}(k,l)=p(k,l)Y(k,l)+q(k,l)G_{min}(k)Y(k,l) \qquad \text{(eq. 19)}$$

Thus, equations 18 and 19 allows a corresponding noise suppression gain function (or in other words a frequency dependent gain) to be readily derived, which can be used to control the digital signal processor 204 comprising either an adaptive filter or a time frequency mask, which both can be used to apply the desired noise suppression gain function.

According to variations the speech absence probability is estimated by mapping a coherent-to-diffuse-ratio CDR onto the speech absence probability using a continuous interpolation of a function representing the coherent-to-diffuse-ratio CDR and wherein the coherent-to-diffuse-ratio CDR is estimated using the similarity between the mean resultant length R and the coherent-to-diffuse-ratio CDR. Thus, in a more specific variation the coherent-to-diffuse-ratio CDR may be set equal to the mean resultant length R. According to other variations the speech presence probability may likewise be estimated based on coherent-to-diffuse-ratio CDR.

According to variations of equation 8 the directional signal-to-noise-ratio $SNR_D$ may be estimated, based on the mean resultant length R, using a relation of the form given by:

$$SNR=f_{SNR}(\ln(R)) \qquad \text{(eq. 20)}$$

wherein $f_{SNR}(.)$ is an arbitrary non-linear function adapted to suppress lower values of SNR more relative to higher values of SNR. In this way it is possible to compensate for the fact that the value of the mean resultant length is typically overestimated for low values of the mean resultant length R due to the limited amount of samples used to estimate the mean resultant length.

However, it is worth emphasizing that the improved methods for noise reduction that are disclosed according to the present invention are not dependent on a specific type of Resultant length, i.e. the term Resultant length may generally refer to the mean resultant length as defined in equation 2, or to an ipse- or contral-lateral mean resultant length as defined in equations 4-a and 4-b, or to an external microphone enhanced mean resultant length as defined in equation 5 or to combinations of these or to a mapped mean resultant length as given by:

$$R(k,l)=|E\{f_2(e^{j\theta_{ab}(k,l)f_1(k,l)})\}| \qquad \text{(eq. 21)}$$

wherein indices l and k represent respectively the frame used to transform the input signals into the time-frequency domain and the frequency bin, wherein E{.} is an expectation operator, wherein $e^{j\Theta_{ab}(k,l)}$ represents the inter-microphone phase difference between the first and the second input signals, wherein $f_1$ is a real variable; and wherein $f_2$ is an arbitrary function. According to a specific variation the mapped mean resultant length is a so called wrapped mean resultant length $\tilde{R}_{ab}$ which is obtained by setting $f_1(k,l)$ equal to $k_u/k$ and leaving out the function $f_2$ and wherein $k_u$ is equal to $2K f_u/f_s$, with $f_u$ representing the upper frequency limit below which phase ambiguities, due to the periodicity of the IPD, are avoided, $f_s$ being the sampling frequency and K the number of frequency bins up to the Nyquist limit. The wrapped mean resultant length $\tilde{R}_{ab}$ is advantageous at least because for diffuse noise $\tilde{R}_{ab}$ approaches zero for all $k<k_u$ while for anechoic sources $\tilde{R}_{ab}$ approaches one as intended whereby an improved ability to distinguish diffuse noise from desired target sources, especially in the low frequency range is obtained. This is especially advantageous for the relatively short microphone spacings that are typical for hearing aid systems.

According to yet another variation any of the above mentioned variations of the (time and frequency dependent) resultant length R may be used directly as a frequency dependent gain, which can be used to control the digital signal processor 204 comprising either an adaptive filter or a time frequency mask, which both can be used to apply the desired frequency dependent gain.

In further variations the methods and selected parts of the hearing aid according to the disclosed embodiments may also be implemented in systems and devices that are not hearing aid systems (i.e. they do not comprise means for compensating a hearing loss), but nevertheless comprise both acoustical-electrical input transducers and electro-acoustical output transducers. Such systems and devices are at present often referred to as hearables. However, a headset is another example of such a system.

According to yet other variations, the hearing aid system needs not comprise a traditional loudspeaker as output transducer. Examples of hearing aid systems that do not comprise a traditional loudspeaker are cochlear implants, implantable middle ear hearing devices (IMEHD), bone-anchored hearing aids (BAHA) and various other electro-mechanical transducer based solutions including e.g. systems based on using a laser diode for directly inducing vibration of the eardrum.

Generally, the various embodiments of the present embodiment may be combined unless it is explicitly stated that they cannot be combined. Especially it may be worth pointing to the possibilities of impacting various hearing aid system signal processing features, including directional systems, based on sound environment classification.

In still other variations a non-transitory computer readable medium carrying instructions which, when executed by a computer, cause the methods of the disclosed embodiments to be performed.

Other modifications and variations of the structures and procedures will be evident to those skilled in the art.

The invention claimed is:

1. A method of operating a hearing aid system comprising the steps of:
    providing a first input signal that is at least derived from the output from a first microphone;
    providing a second input signal that is at least derived from the output from a second microphone;
    providing a third input signal that is at least derived from the output from at least one of the first, the second and a third microphone;
    determining a mean resultant length R based on samples of inter-microphone phase differences between the first and the second input signals;
    determining, based on the mean resultant length R, a frequency dependent gain adapted to provide noise suppression; and
    applying said frequency dependent gain to the third input signal in order to provide a noise suppressed signal.

2. The method according to claim 1, wherein the step of determining, based on the mean resultant length R, a frequency dependent gain adapted to provide noise suppression comprises the further steps of:
    determining, based on the mean resultant length R, a measure of at least one sound environment characteristic, wherein the at least one sound environment characteristic is selected from a group comprising a signal-to-noise ratio SNR, a speech presence probability, a speech absence probability, a power spectral density noise estimate, and a power spectral density target signal estimate; and
    using said measure to provide said frequency dependent gain.

3. The method according to claim 2, wherein the step of determining, based on the mean resultant length R, a measure of at least one sound environment characteristic comprises the further steps of:
    determining a first value of said measure based on the mean resultant length;
    determining a second value of said measure based on at least one of spectral and temporal properties; and
    combining the first value and the second value of said measure and hereby providing the measure.

4. The method according to claim 2, wherein the step of determining, based on the mean resultant length R, a measure of at least one sound environment characteristic comprises the further steps of:
    determining a measure of a coherent-to-diffuse-ratio CDR using the similarity between the mean resultant length R and the coherent-to-diffuse-ratio CDR; and
    determining the measure of the speech absence probability SAP or the speech presence probability SPP by mapping the coherent-to-diffuse-ratio CDR onto the speech absence probability SAP or the speech presence probability SPP using a continuous interpolation of a function representing the coherent-to-diffuse-ratio CDR.

5. The method according to claim 2, wherein the step of determining, based on the mean resultant length R, a measure of at least one sound environment characteristic is carried out by determining the signal-to-noise-ratio SNR using a relation of the form given by:

$$SNR=f_{SNR}(\ln(R))$$

wherein $f_{SNR}$ is an arbitrary non-linear function adapted to suppress lower values of SNR more relative to higher values of SNR.

6. The method according to claim 2, wherein the step of determining, based on the mean resultant length R, a measure of at least one sound environment characteristic is carried out by determining the signal-to-noise-ratio SNR using a relation of the form given by:

$$SNR = -\frac{1}{2\ln(R)}$$

7. The method according to claim 2, wherein the step of using said measure to provide said frequency dependent gain comprises the further step of:
  using at least one single-channel noise suppression method including Wiener filtering and statistically-based methods selected from a group of methods comprising maximum likelihood, minimum mean square error, Bayesian filtering, Kalman filtering and maximum a posteriori of spectral amplitude or of spectral phase or of both.

8. The method according to claim 1, wherein the mean resultant length R is given by the relation:

$$E\left\{\frac{Y_{HA}Y_{Ex}^*}{|Y_{HA}Y_{Ex}^*|}\right\} = Re^{j\hat{\theta}}$$

wherein $Y_{HA}$ represents the first input signal that is at least derived from the output from the first microphone that is accommodated in a hearing aid of the hearing aid system;
  wherein $Y_{Ex}$ represents the second input signal that is at least derived from the output from the second microphone that is accommodated in an external device of the hearing aid system;
  wherein the external device is adapted to be positioned closer to a target sound source than said hearing aid of the hearing aid system; and
  wherein $\hat{\theta}$ represent an unbiased mean phase, and wherein E{ } is an expectation operator.

9. The method according to claim 1, comprising the further step of:
  use spatial processing to provide at least one of the first, second and third input signals.

10. The method according to claim 1, comprising the further step of
  transforming the input signals from a time domain representation and into a time-frequency domain representation.

11. The method according to claim 1, wherein the mean resultant length R is determined at least partly, using an expression of the form given by:

$$R(k,l) = |E\{f_2(e^{j\theta_{ab}(k,l)f_1(k,l)})\}|$$

wherein indices l and k represent respectively the frame used to transform the input signals into the time-frequency domain and the frequency bin, wherein E{.} is an expectation operator, wherein $e^{j\theta_{ab}(k,l)}$ represents the inter-microphone phase difference between the first and the second input signals, wherein $f_1$ is a real variable; and wherein $f_2$ is an arbitrary function.

12. The method according to claim 1, wherein the step of determining, based on the mean resultant length R, a frequency dependent gain adapted to provide noise suppression comprises the steps of:
  determining an unbiased mean phase from samples of inter-microphone phase differences between the first and the second input signals;
  determining the frequency dependent gain adapted to provide noise suppression based also on the unbiased mean phase.

13. The method according to claim 1, wherein the step of applying said frequency dependent gain to the third input signal in order to provide a noise suppressed signal is carried out using the step of:
  applying said frequency dependent gain as part of a single channel noise suppression method.

14. The method according to claim 1, wherein the step of determining a mean resultant length R based on samples of inter-microphone phase differences between the first and the second input signals comprises the further steps of:
  determining a first mean resultant length from samples of inter-microphone phase differences between the first and the second input signals;
  determining a second mean resultant length from samples of inter-microphone phase differences between a fourth input signal and a fifth input signal, wherein the fourth input signal is at least derived from the output from a fourth microphone and wherein the fifth input signal is at least derived from the output from a fifth microphone; and
  combining the first mean resultant length and the second mean resultant length and hereby providing the mean resultant length R.

15. The method according to claim 1, wherein the step of determining a mean resultant length R based on samples of inter-microphone phase differences between the first and the second input signals comprises the further steps of:
  determining a first mean resultant length from samples of inter-microphone phase differences between the first and the second input signals;
  determining a second mean resultant length from samples of inter-microphone phase differences between a fourth input signal and the second input signal wherein the fourth input signal is at least derived from a signal from a fourth microphone; and
  combining the first mean resultant length and the second mean resultant length and hereby providing the mean resultant length R.

16. A hearing aid system comprising a first and a second microphone, a sound estimator, a digital signal processor and an electrical-acoustical output transducer;
  wherein the sound estimator is adapted to:
    determine a mean resultant length R from samples of inter-microphone phase differences between a first and a second input signal; and
    determine a frequency dependent gain adapted to provide noise suppression based on the determined mean resultant length R;
  wherein the digital signal processor is configured to:
    apply the frequency dependent gain to a third input signal in order to provide a noise suppressed signal to be provided by the electrical-acoustical output transducer; and
  wherein the first input signal is at least derived from the output from the first microphone, the second input signal is at least derived from the output from the second microphone, and the third input signal is at least derived from at least one of the outputs from the first microphone, the second microphone and a third microphone.

17. The hearing aid system according to claim 16, comprising a filter bank configured to transform at least the first and the second input signal into the time frequency domain.

18. The hearing aid system according to claim 16, wherein the first microphone is accommodated in a first hearing aid of the hearing aid system and the second microphone is accommodated in an external device adapted to be positioned closer to a target sound source than the first hearing aid of the hearing aid system.

19. A non-transitory computer readable medium carrying instructions which, when executed by a computer, cause the following method to be performed:
 providing a first input signal that is at least derived from the output from a first microphone;
 providing a second input signal that is at least derived from the output from a second microphone;
 providing a third input signal that is at least derived from the output from at least one of the first, the second and a third microphone;
 determining a mean resultant length R based on samples of inter-microphone phase differences between the first and the second input signals;
 determining, based on the mean resultant length R, a frequency dependent gain adapted to provide noise suppression; and
 applying said frequency dependent gain to the third input signal in order to provide a noise suppressed signal.

* * * * *